(12) United States Patent
Saint-Preux

(10) Patent No.: US 12,028,601 B2
(45) Date of Patent: Jul. 2, 2024

(54) INCLUSIVE CAMERA

(71) Applicant: Snap Inc., Santa Monica, CA (US)

(72) Inventor: Bertrand Saint-Preux, Hollywood, FL (US)

(73) Assignee: Snap Inc., Santa Monica, CA (US)

( * ) Notice: Subject to any disclaimer, the term of this patent is extended or adjusted under 35 U.S.C. 154(b) by 50 days.

(21) Appl. No.: 17/709,089

(22) Filed: Mar. 30, 2022

(65) Prior Publication Data

US 2022/0321769 A1 Oct. 6, 2022

Related U.S. Application Data

(60) Provisional application No. 63/168,082, filed on Mar. 30, 2021.

(51) Int. Cl.
| | |
|---|---|
| *H04N 23/62* | (2023.01) |
| *G06F 3/0482* | (2013.01) |
| *H04N 17/00* | (2006.01) |
| *H04N 23/63* | (2023.01) |
| *H04N 23/80* | (2023.01) |

(52) U.S. Cl.
CPC ........... *H04N 23/62* (2023.01); *G06F 3/0482* (2013.01); *H04N 17/002* (2013.01); *H04N 23/632* (2023.01); *H04N 23/80* (2023.01)

(58) Field of Classification Search
CPC .... H04N 23/64; H04N 23/631; H04N 23/611; H04N 23/62; H04N 23/80; H04N 23/632; H04N 17/002; H04N 5/2621; G06F 3/0482; G06F 3/04847; G06V 40/161
USPC ...................................................... 348/222.1
See application file for complete search history.

(56) References Cited

U.S. PATENT DOCUMENTS

| | | | |
|---|---|---|---|
| 7,272,597 B2 * | 9/2007 | Chowdhury | G06F 16/955 |
| 9,565,410 B2 * | 2/2017 | Huai | H04N 9/646 |
| 9,967,467 B2 * | 5/2018 | Gao | H04N 23/632 |

(Continued)

FOREIGN PATENT DOCUMENTS

| | | |
|---|---|---|
| CN | 108093178 | 5/2018 |
| CN | 117136553 A | 11/2023 |

(Continued)

OTHER PUBLICATIONS

"International Application Serial No. PCT/US2022/022643, International Search Report mailed Jul. 15, 2022", 5 pgs.

(Continued)

*Primary Examiner* — Pritham D Prabhakher
(74) *Attorney, Agent, or Firm* — Schwegman Lundberg & Woessner, P.A.

(57) ABSTRACT

Method of generating modified media content item based on user's setting selection starts with a processor causing a camera personalization interface to be displayed by a display of a client device. The processor receives a setting selection from the client device via the camera personalization interface. The processor determines a pre-capture setting and a post-processing setting based on the setting selection. The processor calibrates a camera of the client device using the pre-capture setting. The processor receives a media content item including an image captured using the camera and generates a modified media content item by modifying the media content item using the post-processing setting. Other embodiments are described herein.

21 Claims, 10 Drawing Sheets

(56) References Cited

U.S. PATENT DOCUMENTS

| | | | |
|---|---|---|---|
| 10,362,219 B2* | 7/2019 | Wilson | G06T 7/20 |
| 10,719,729 B2* | 7/2020 | Kuo | G06Q 30/0282 |
| 10,965,924 B2* | 3/2021 | Huai | H04N 23/64 |
| 11,284,013 B2* | 3/2022 | Lu | H04N 1/6033 |
| 11,321,830 B2* | 5/2022 | Ding | G06T 7/0012 |
| 11,321,882 B1* | 5/2022 | Troutman | G06V 40/16 |
| 11,625,878 B2* | 4/2023 | Chong | G06V 40/161 |
| | | | 345/419 |
| 2006/0077405 A1 | 4/2006 | Topfer et al. | |
| 2009/0033667 A1* | 2/2009 | Xu | G06T 19/00 |
| | | | 345/474 |
| 2011/0025689 A1* | 2/2011 | Perez | A63F 13/69 |
| | | | 345/420 |
| 2015/0049211 A1* | 2/2015 | Lim | H04N 23/61 |
| | | | 348/211.1 |
| 2015/0213303 A1* | 7/2015 | Jain | H04N 23/71 |
| | | | 382/118 |
| 2015/0326842 A1* | 11/2015 | Huai | G08B 25/006 |
| | | | 348/223.1 |
| 2016/0353030 A1 | 12/2016 | Gao et al. | |
| 2017/0061609 A1* | 3/2017 | Son | G06Q 30/0251 |
| 2018/0033149 A1* | 2/2018 | Jeong | G06V 10/17 |
| 2018/0091732 A1* | 3/2018 | Wilson | H04N 23/631 |
| 2018/0260871 A1* | 9/2018 | Harvill | G06F 3/04817 |
| 2019/0206031 A1* | 7/2019 | Kim | G06T 5/80 |
| 2020/0380674 A1* | 12/2020 | Ding | G06T 7/0012 |
| 2020/0413020 A1* | 12/2020 | Huai | H04N 9/73 |
| 2021/0227152 A1* | 7/2021 | Zhang | G06T 11/00 |

FOREIGN PATENT DOCUMENTS

| | | |
|---|---|---|
| WO | 2020077494 | 4/2020 |
| WO | 2021042134 | 3/2021 |
| WO | WO-2022212577 A1 | 10/2022 |

OTHER PUBLICATIONS

"International Application Serial No. PCT/US2022/022643, Written Opinion mailed Jul. 15, 2022", 6 pgs.

"International Application Serial No. PCT/US2022/022643, International Preliminary Report on Patentability mailed Oct. 12, 2023", 8 pgs.

\* cited by examiner

INCLUSIVE CAMERA

CLAIM OF PRIORITY

This application claims the benefit of priority to U.S. Provisional Application Ser. No. 63/168,082, filed Mar. 30, 2021, which is incorporated herein by reference in its entirety.

BACKGROUND

Electronic messaging, particularly instant messaging, continues to grow globally in popularity. Users are quickly able to share with one another electronic media content items including text, audio, images, pictures and videos instantly.

Current client devices, such as smartphones, are equipped with cameras for the user to quickly capture pictures and videos to be shared. However, these cameras still fail to work equitably for everyone in every situation or lighting conditions.

The deficiencies of cameras stem from the camera design at its inception. The "Shirley Cards", introduced in the 1940s, are the color reference cards used to perform skin-color balance in still photography printing. Cameras were designed specifically to capture the skin tone of the White woman that is featured on the "Shirley Cards." Since the camera was not invented with people of all skin tones in mind, the design process failed to recognize the need for an extended dynamic range.

Current cameras are still not appropriately designed to account for and optimize pictures and videos for all skin tones. When capturing pictures low light, current cameras search for light or a lightened part within the viewfinder before the shutter is released. If there is no lightened part, the camera will be focusing on a dark part within the viewfinder and is rendered inactive. In other words, the camera only knows how to calibrate itself against lightness to define an image. Similarly, innovative technology such as facial tracking is unable to recognize darker skin tones in some lighting conditions.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Embodiments of the present disclosure improve the functionality of camera systems as well as electronic messaging software and systems by generating modified media content items including images (e.g., photos and videos) captured using the cameras that account for different skin tones in every situation or lighting conditions. This ensures that the cameras and the messaging system can equitably produce high quality images for every user and thus, improving the camera experience for all users.

Specifically, embodiments of the present disclosure cause a camera personalization interface to be displayed on a client device and receive a setting selection from the client device via the camera personalization interface. The setting selection can be associated with a skin tone or a skin undertone of a user of the client device. A pre-capture setting and a post-processing setting can be determined using the setting selection. The pre-capture setting can be stored on the client device such that it is personalized to the user of the client device and the camera of the client can be calibrated using the pre-capture setting. Similarly, when the camera is used to capture an image, a media content item that includes the image is received and modified using the post-processing setting to generate a modified media content item such that the post-processing performed to generate the modified media content item is also personalized to the user of the client device.

Networked Computing Environment

Figure 1:
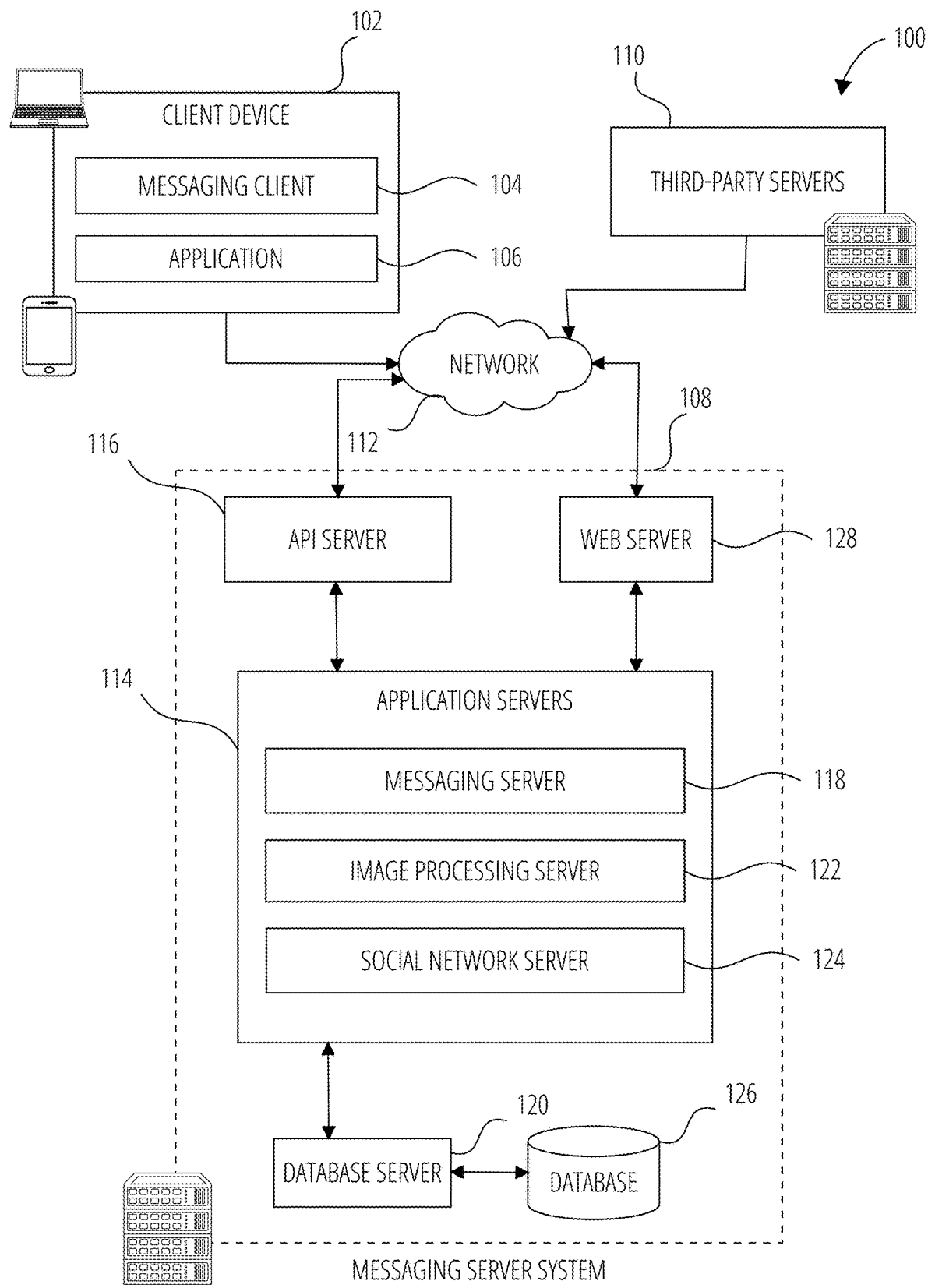
FIG. 1 is a diagrammatic representation of a networked environment in which the present disclosure may be deployed, in accordance with some examples.

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other applications 106. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications 106 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 3:
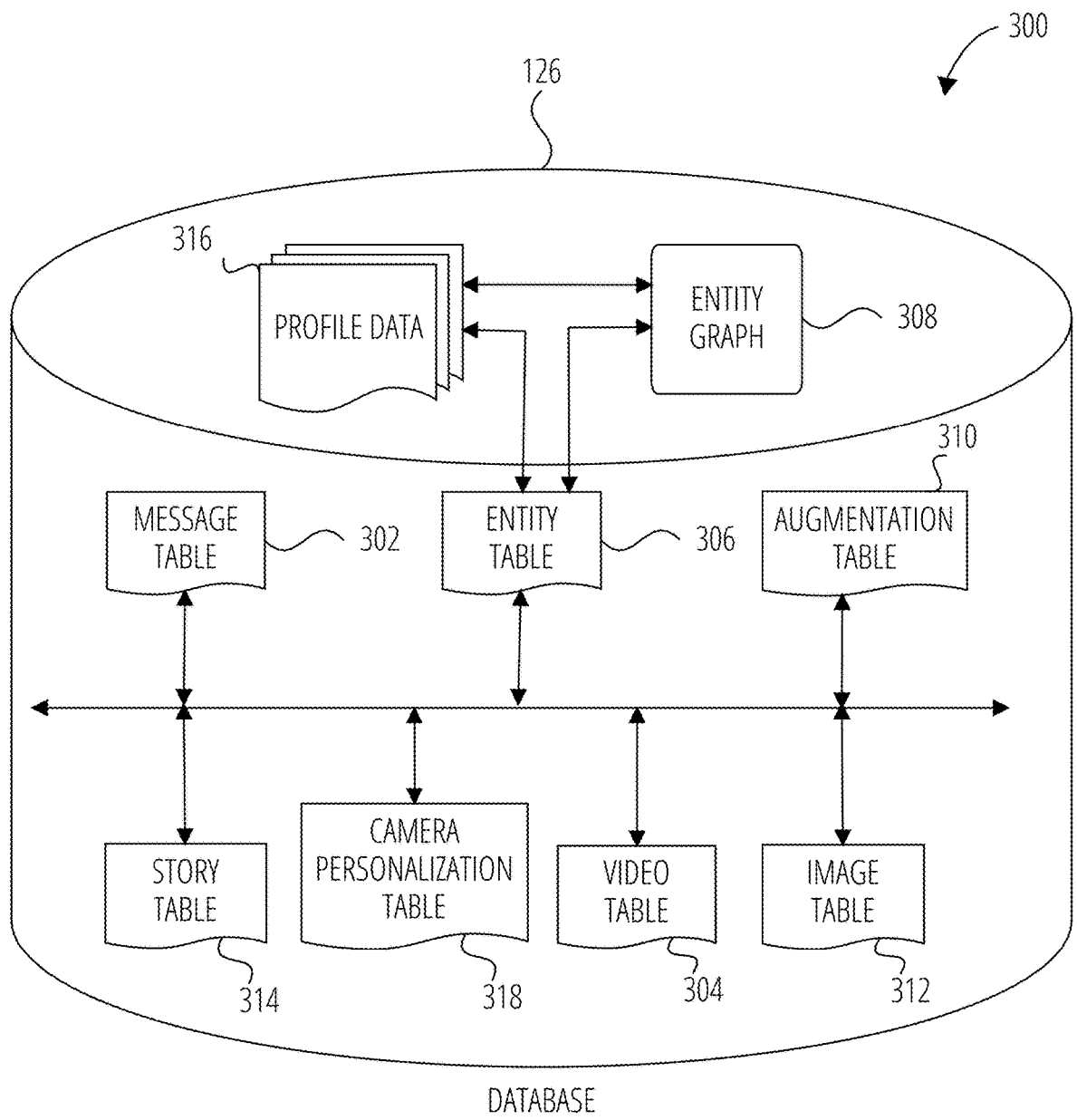
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., an application 106 or applet) are made available to a user via an interface of the messaging client 104. In this context, "external" refers to the fact that the application 106 or applet is external to the messaging client 104. The external resource is often provided by a third party but may also be provided by the creator or provider of the messaging client 104. The messaging client 104 receives a user selection of an option to launch or access features of such an external resource. The external resource may be the application 106 installed on the client device 102 (e.g., a "native app"), or a small-scale version of the application (e.g., an "applet") that is hosted on the client device 102 or remote of the client device 102 (e.g., on third-party servers 110). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the messaging client 104 determines whether the selected external resource is a web-based external resource or a locally-installed application 106. In some cases, applications 106 that are locally installed on the client device 102 can be launched independently of and separately from the messaging client 104, such as by selecting an icon, corresponding to the application 106, on a home screen of the client device 102. Small-scale versions of such applications can be launched or accessed via the messaging client 104 and, in some examples, no or limited portions of the small-scale application can be accessed outside of the messaging client 104. The small-scale application can be launched by the messaging client 104 receiving, from a third-party server 110 for example, a markup-language document associated with the small-scale application and processing such a document.

In response to determining that the external resource is a locally-installed application 106, the messaging client 104 instructs the client device 102 to launch the external resource by executing locally-stored code corresponding to the external resource. In response to determining that the external resource is a web-based resource, the messaging client 104 communicates with the third-party servers 110 (for example) to obtain a markup-language document corresponding to the selected external resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
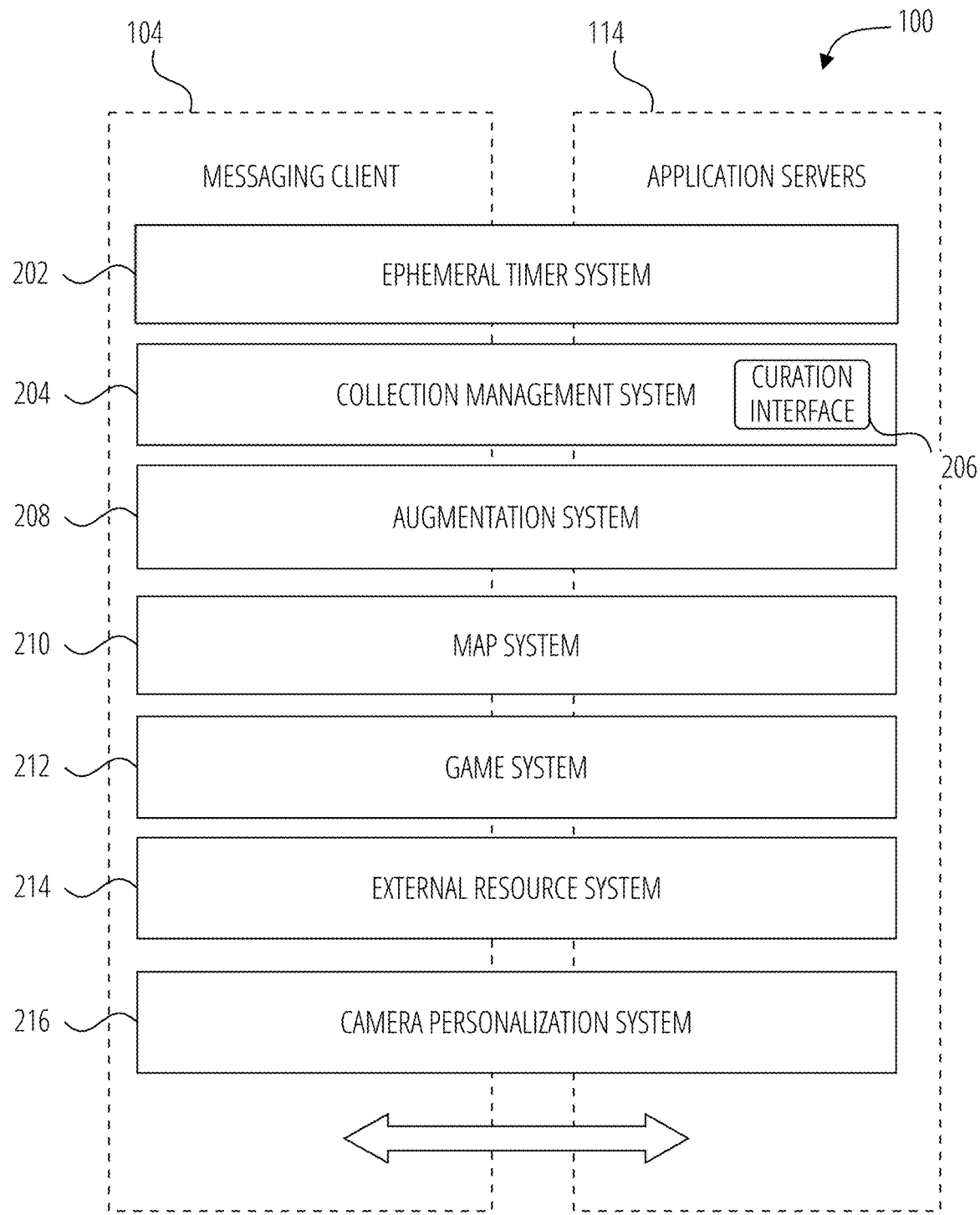
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and/or on the server-side by the application servers 114. These subsystems include, for example, an ephemeral timer system 202, a collection management system 204, an augmentation system 208, a map system 210, a game system 212, an external resource system 214, and a camera personalization system 216.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time.

The map system 210 provides various geographic location functions, and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

The external resource system 214 provides an interface for the messaging client 104 to communicate with remote servers (e.g., third-party servers 110) to launch or access external resources, i.e., applications or applets. Each third-party server 110 hosts, for example, a markup language (e.g., HTML5) based application or small-scale version of an application (e.g., game, utility, payment, or ride-sharing application). The messaging client 104 may launches a web-based resource (e.g., application) by accessing the HTML5 file from the third-party servers 110 associated with the web-based resource. In certain examples, applications hosted by third-party servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given external resource access to certain user data of the messaging client 104. HTML5 is used as an example technology for programming games, but applications and resources programmed based on other technologies can be used.

In order to integrate the functions of the SDK into the web-based resource, the SDK is downloaded by a third-party server 110 from the messaging server 118 or is otherwise received by the third-party server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., applications 106 or applets and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between third-party servers 110 and the messaging client 104. In certain examples, a WebViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with third-party servers 110. The SDK limits which information is shared based on the needs of the external resource. In certain examples, each third-party server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale applications (e.g., an application 106) are provided with access to a first type of user data (e.g., only two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The camera personalization system 216 controls the settings associated with cameras included in the client device 102 for use with the messaging system 100. The settings can include pre-capture settings and post-processing settings. The camera personalization system 216 can cause the cameras included in the client device 102 to be calibrated in accordance with the pre-capture settings. The camera personalization system 216 can store the pre-capture settings in the memory of the client device 102. The camera personalization system 216 can be configured to function with the image processing server 122 to perform various image processing operations on media content items (e.g., images or videos) including performing post-processing in accordance with the post-processing settings.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interest-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

In one example, metadata associated with media content items such as images or videos that are publicly shared on the messaging system 100 can be stored in the camera personalization table 318. The metadata can indicate the pre-capture settings of the camera capturing the media content item, the type of camera used to capture the media content item, and the post-processing settings applied in the media content item, the setting selection (e.g., skin tone, skin undertone, etc.) associated with the camera, the background color, the lighting condition, etc.

Data Communications Architecture

Figure 4:
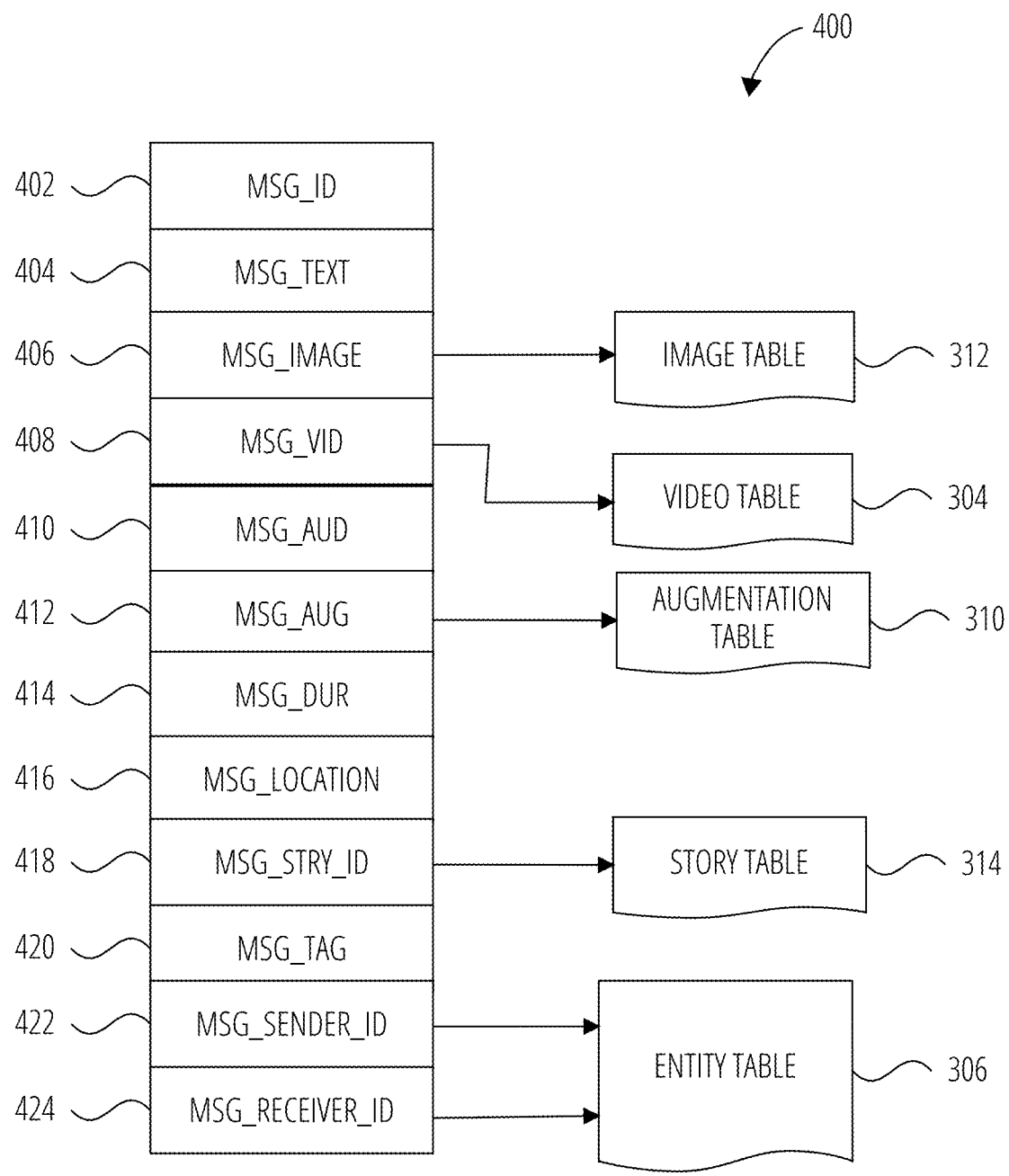
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the Client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentations 412 may point to data stored in an augmentation table 310, values stored within the message story identifier 418 may point to data stored in a story table 314, and values stored within the message sender identifier 422 and the message receiver identifier 424 may point to user records stored within an entity table 306.

Camera Personalization Interface

In some examples, to optimize the camera of the client device 102 and the user's experience on the messaging system 100, the camera personalization system 216 can allow for customization of the settings of the camera of the client device 102.

The camera personalization system 216 can query the user of the client device 102 via the camera personalization interface 500 for a setting selection related to, for example, the user's skin tone or skin undertone. By allowing the user to self-elect a skin tone or skin undertone as a setting selection, the camera personalization system 216 is providing the user with the choice to indicate exactly how they present. With that information, the camera personalization system 216 can configure the camera appropriately for the user. For example, the setting selection is used to inform the calibration of the camera for pre-capture and post-processing of images.

FIG. 5A-5E illustrate examples of a camera personalization interface 500 in accordance with some examples. The camera personalization interface 500 can be caused to be displayed during the on-boarding process of the user on the messaging system 100. In another example, the camera personalization interface 500 can be caused to be displayed when the user of the client device 102 requests the configuration of the camera via the settings of the messaging client 104. Accordingly, the user is able to optionally opt-in to the camera personalization system 216's personalization of the camera for the user.

Figure 5B:
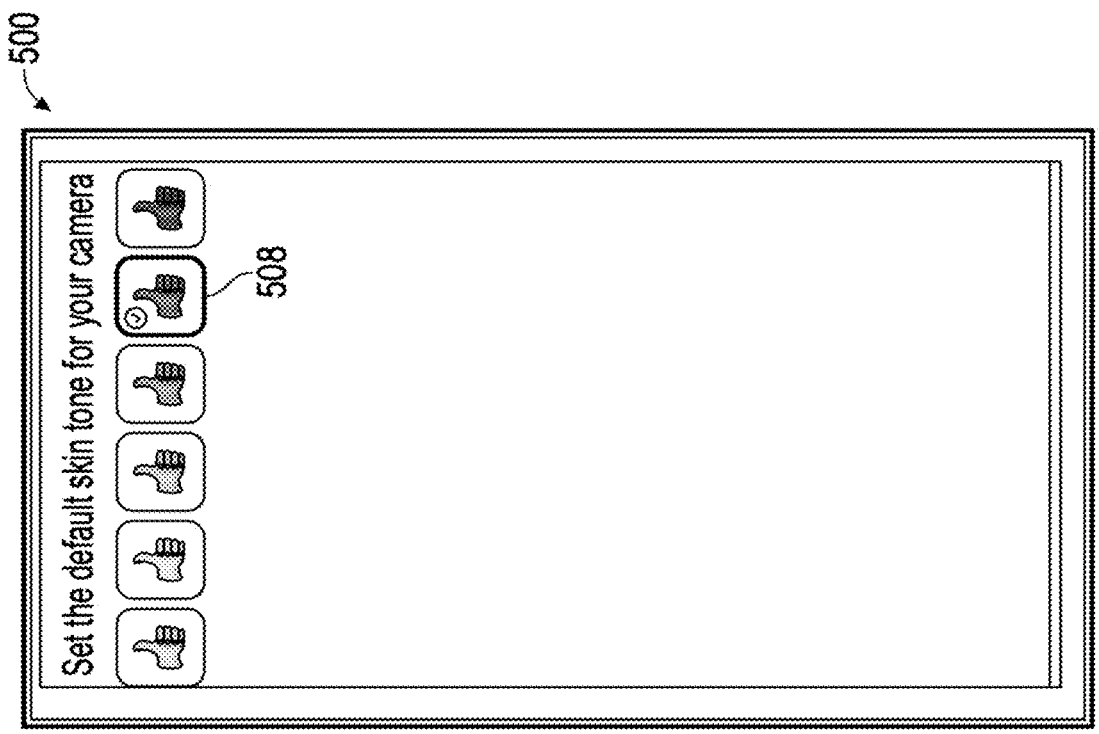
FIG. 5A-5E illustrate examples of the camera personalization interface 500 in accordance with some examples.
Figure 5A:
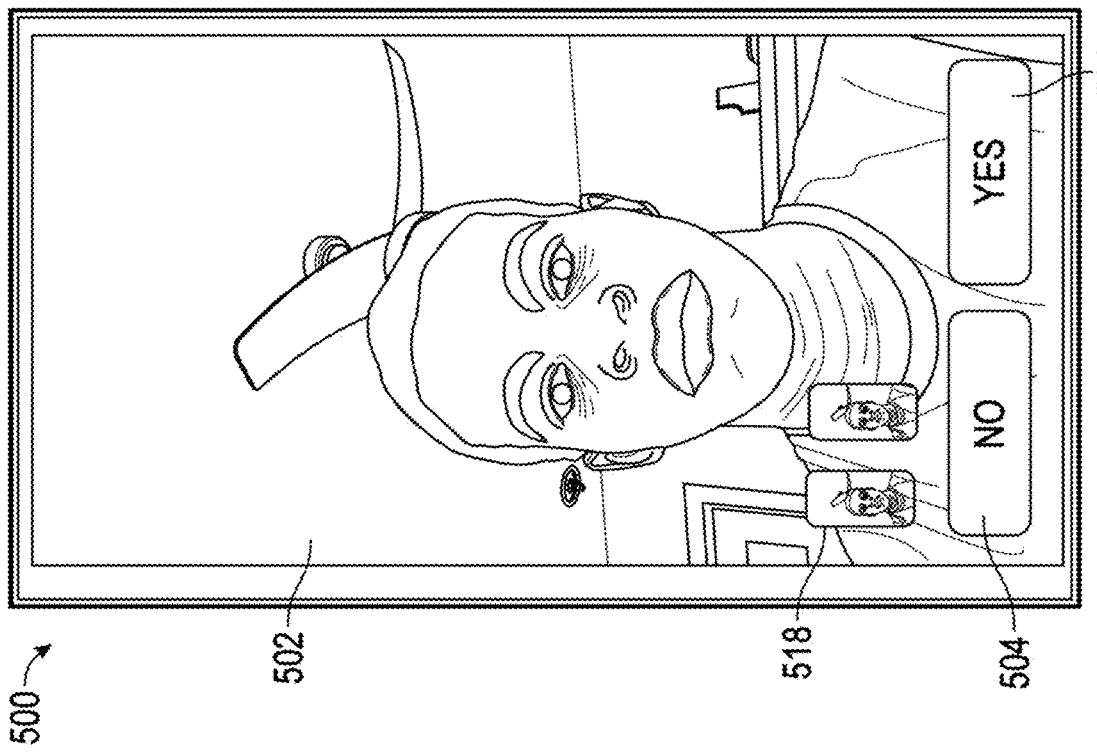

In FIG. 5A, the camera personalization interface 500 includes an example of a binary comparison. The user can capture a range of photos using a camera on the client device 102 with various corrections (e.g., pre-capture settings and post-processing settings) applied thereto. In one example, the camera is the front camera that allows for "selfies" (e.g., a photo of the user's face captured by the front camera).

A preview 502 of the photos captured using the camera is caused to be displayed on the camera personalization interface 500. The camera personalization interface 500 also includes a preview carousel 518, a selectable item 504 and a selectable item 506. Using the preview carousel 518, the user can select each of the photos captured and cause a preview 502 of the selected photo from the preview carousel 518 to be displayed. The user can select the selectable item 504 to reject the photo being displayed in the preview 502 and the user can select to selectable item 506 to approve the photo being displayed in the preview 502.

In one example, the photo that is approved by the user using the selectable item 506 is identified as the setting selection for the user of the client device 102. In one example, the camera personalization system 216 stores the setting selection in the memory of the client device 102 or in the messaging client 104. The camera personalization system 216 can also identify and store the corrections applied on the photo that was approved in the memory of the client device 102 or in the messaging client 104.

In FIG. 5B, the camera personalization interface 500 includes an example of a direct election. The camera personalization interface 500 in FIG. 5B comprises a plurality of selectable items 508. Each of the selectable items 508 can include an image or an icon that is associated with a different skin tone or skin undertone. For example, in FIG. 5B, the images are emojis of a thumbs up in different skin tones.

In one embodiment, the camera personalization interface 500 can include selectable items 508 associated with skin tones and another set of selectable items 508 associated with skin undertones. In one example, the skin undertones can include cool, warm, and neutral. In another example, the skin undertones can include the undertones identified in foundation makeup such as neutral, golden, olive, yellow, pink, red, and peach.

The user can select one of the selectable items 508, as shown in FIG. 5B, and the camera personalization system 216 can store a setting selection associated with the user's selection in the memory of the client device 102 or in the messaging client 104.

Figure 5C:
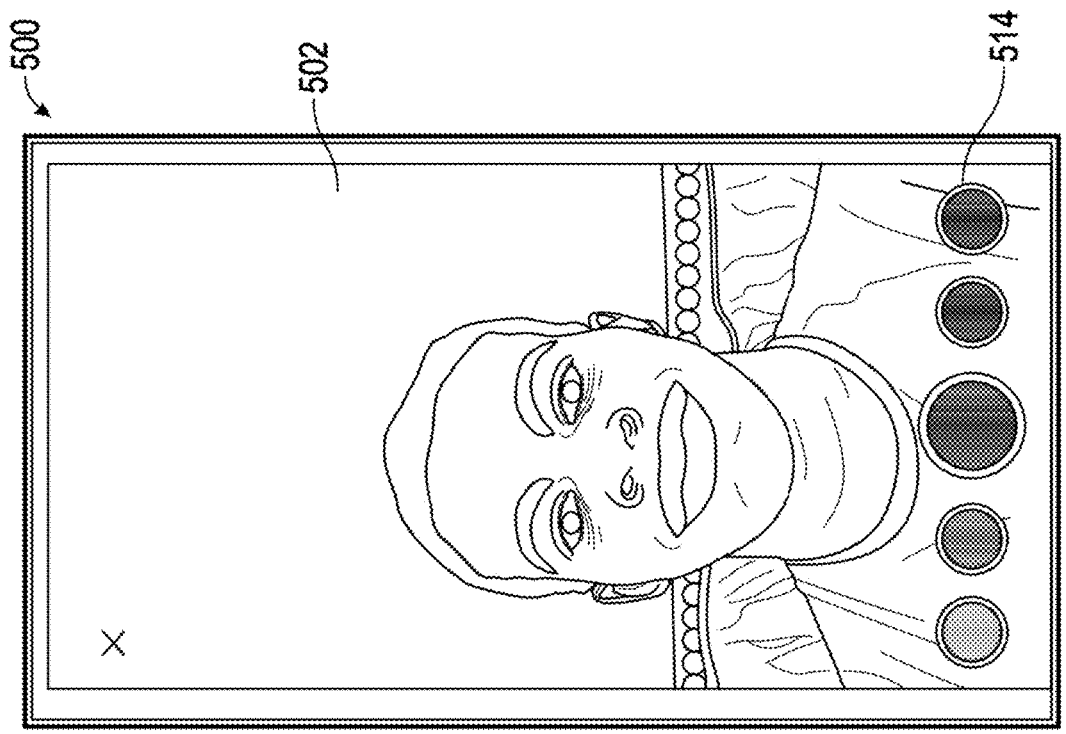

In FIG. 5C, the camera personalization interface 500 includes an example of fine calibration. In the camera personalization interface 500. In FIG. 5C, the user presented with the preview 502 of the image captured by the camera of the client device 102. In one example, the camera is the front camera that allows for "selfies".

The camera personalization interface 500 includes at least one selectable slider 510 or selectable slider 512 that allows the user to calibrate aspects of the image being displayed in the preview 502. The selectable sliders 510 and 512 include indicators 522 and 524.

For example, the user can select the indicator 522 and adjust the location of indicator 522 on the selectable slider 510 to cause a pre-capture setting to be increased or decreased. The pre-capture setting that can be adjusted using the selectable slider 510 can be, for example, an exposure setting. In another example, another pre-capture setting can be associated with the selectable slider 512 and can also be adjusted using the indicator 524. The pre-capture level setting that can be adjusted using the selectable slider 512 can be, for example, ISO setting (e.g., measurement sensitivity to the light), a Black and White balance setting, or a High Dynamic Range (HDR) capture setting.

The camera personalization system 216 can store a setting selection associated with the user's setting of the selectable slider 510 or selectable slider 512. The setting selection can be stored in the memory of the client device 102 or in the messaging client 104.

Figure 5D:
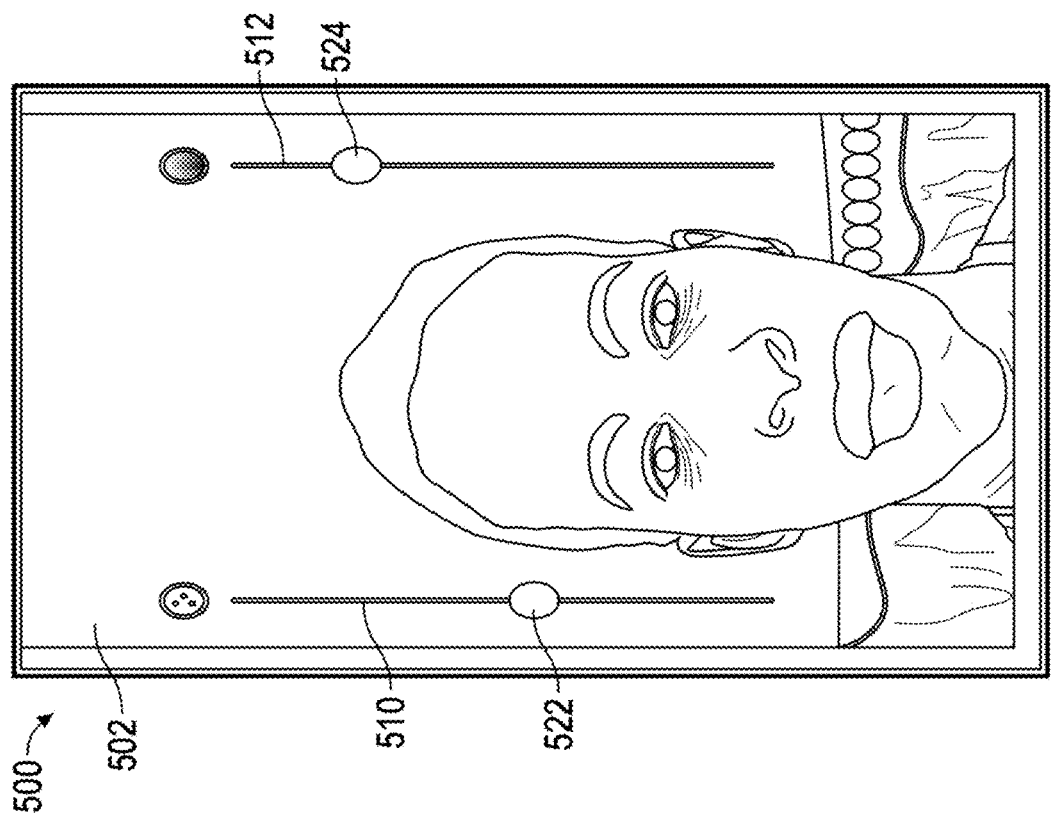

In FIG. 5D, the camera personalization interface 500 includes an example of simple calibration. In the camera personalization interface 500. In FIG. 5D, the user presented with the preview 502 of the image captured by the camera of the client device 102. In one example, the camera is the front camera that allows for "selfies".

The camera personalization interface 500 in FIG. 5D comprises a plurality of selectable items 514. Each of the selectable items 514 can include a color representative of a different skin tone or skin undertone.

In one embodiment, the camera personalization interface 500 can include selectable items 514 associated with skin tones and another set of selectable items 514 associated with skin undertones. In one example, the skin undertones can include cool, warm, and neutral. In another example, the skin undertones can include the undertones identified in foundation makeup such as neutral, golden, olive, yellow, pink, red, and peach.

The user can select one of the selectable items 514, as shown in FIG. 5D, and the camera personalization system 216 can store a setting selection associated with the user's selection in the memory of the client device 102 or in the messaging client 104.

Figure 5E:
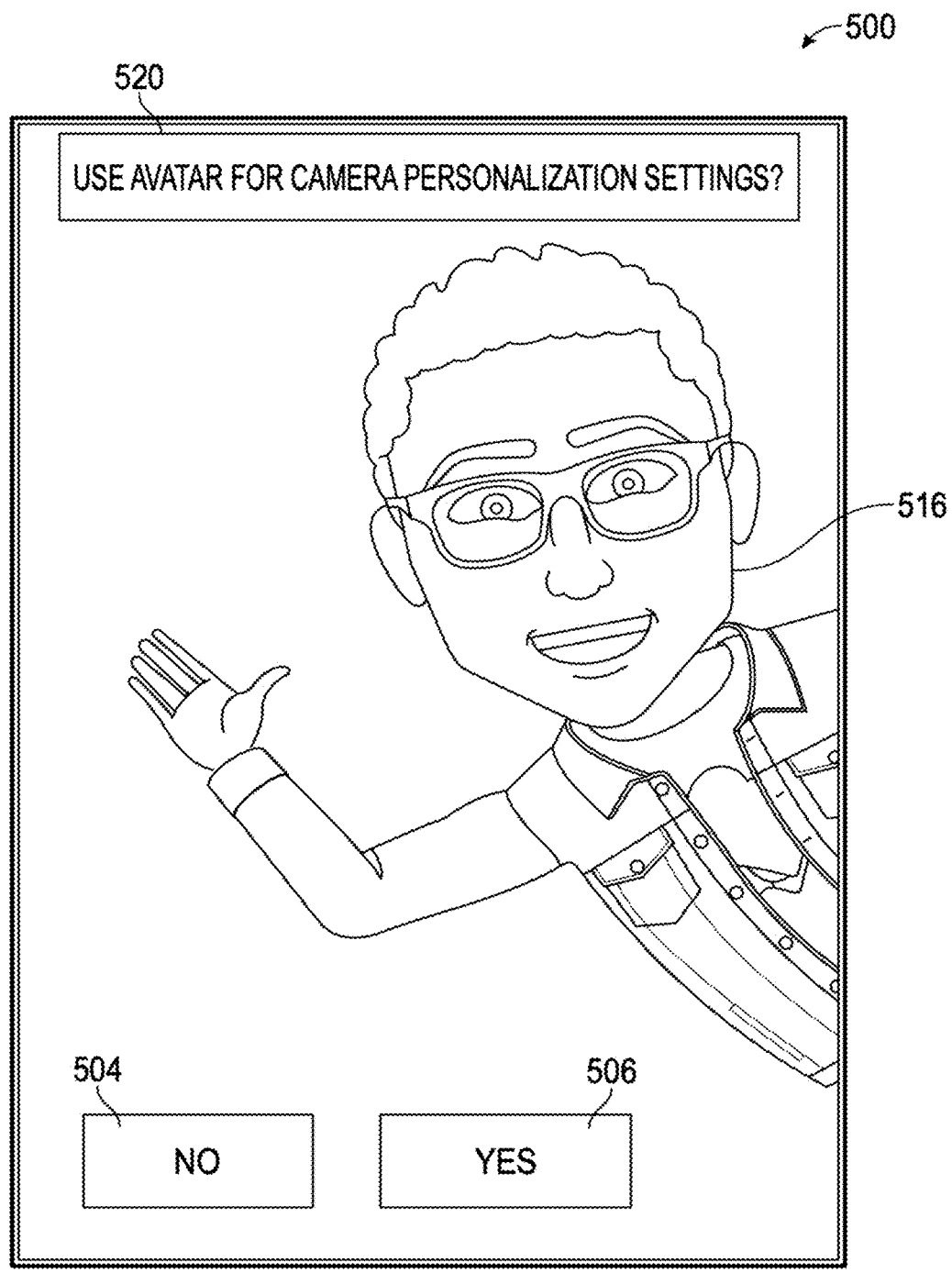

In FIG. 5E, the camera personalization interface 500 includes an example of an avatar calibration. The camera personalization interface 500 in FIG. 5E comprises an avatar 516 and the selectable item 504 and the selectable item 506.

In this example, the user has previously created an avatar that is associated with the user on the messaging system 100. The camera personalization system 216 can retrieve the user's avatar 516 and cause the avatar 516 to be generated in camera personalization interface 500. The camera personalization interface 500 can also include a query prompt 520 that asks the user whether the avatar 516 can be used by the camera personalization system 216 to personalize the camera for the user. The user can select selectable item 504 to reject the use of the avatar 516 or the user can select the selectable item 506 to approve the use of the avatar 516.

In response to the user approving the use of the avatar 516, the camera personalization system 216 can analyze the attributes of the avatar 516. In one example, the camera personalization system 216 analyzes the attribute associated with the selected skin tone for the avatar 516 and generate a setting selection based on the selected skin tone for the avatar 516. The camera personalization system 216 can store the setting selection in the memory of the client device 102 or in the messaging client 104.

Method of Generating Modified Media Content Items Based on User's Setting Selection Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Figure 6:
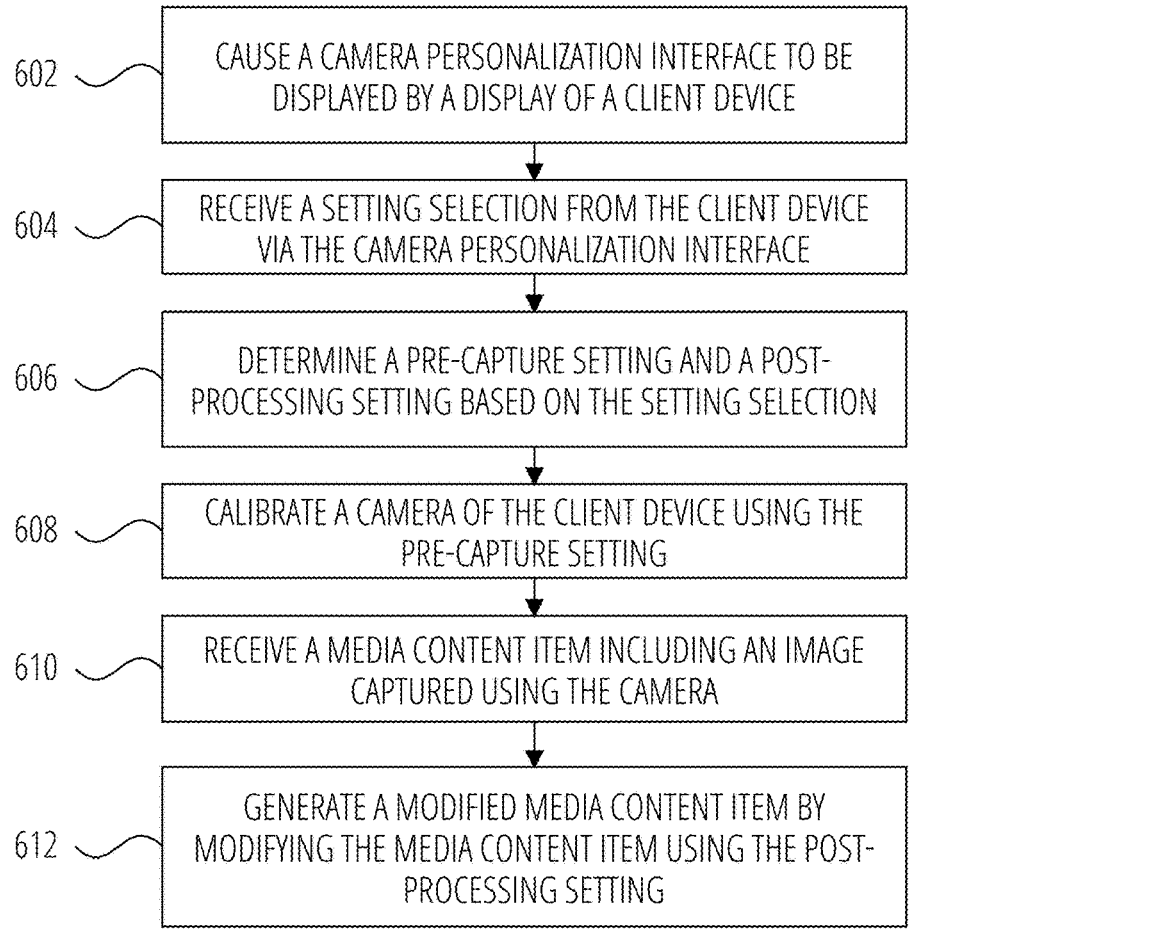
FIG. 6 illustrates a process 600 of generating modified media content item based on user's setting selection in accordance with one example.

FIG. 6 illustrates a process 600 of generating modified media content item based on user's setting selection in accordance with one example. In one example, the processor in a camera personalization system 216, the processor in the client device 102, the processor in the messaging server system 108 or any combination thereof, can perform the operations in process 600.

In operation 602, a processor causes a camera personalization interface 500 to be displayed by a display of a client device 102 and in operation 604, the processor receives a setting selection from the client device 102 via the camera personalization interface 500.

In one example, as shown in FIG. 5B and FIG. 5D, the camera personalization interface 500 comprises a plurality of selectable items associated with a plurality of skin tones. The setting selection can be associated with one of the plurality of selectable items. The setting selection can be associated with a skin tone of a user of the client device 102. In another example, the camera personalization interface 500 can further include selectable items associated with a plurality of undertones. The setting selection can be associated with a skin undertone of the user of the client device 102.

As shown in FIG. 5A, FIG. 5C, and FIG. 5D, the camera personalization interface 500 can also comprises a preview 502 displaying an image captured by the camera of the client device 102. The camera can be a front camera or a rear camera. As shown in FIG. 5C, the camera personalization interface 500 comprises a selectable slider 510 or 512 that is configured to adjust the image displayed in the preview 502. In this embodiment, the setting selection is based on a location of an indicator (e.g., indicator 522 and indicator 524 in FIG. 5C) on the selectable slider 510 or 512.

In the example in FIG. 5E, the camera personalization interface 500 can query the user whether an avatar 516 associated with the user can be used to personalize the camera. With the user's approval via the camera personalization interface 500, the processor can assess attributes associated with the avatar 516 to generate the setting selection. For example, the processor can assess the attribute associated with a skin tone of the avatar 516 to generate the setting selection.

In operation 606, the processor determines a pre-capture setting and a post-processing setting based on the setting selection. In one example, the pre-capture setting and the post-processing setting is further based on a background color or a lighting condition.

The pre-capture setting comprises an ISO setting, an exposure setting, a black and white balance setting, a focus area setting, a High Dynamic Range (HDR) capture setting, or any combination thereof.

The post-processing setting comprises a Gamma correction, a color tone mapping, de-noising, beautification, or any combination thereof. Beautification is a post-processing setting that corrects the image of the user in the media content item to render the user appearance to be "more beautiful". In some examples, beautification includes touching up the image to smoothen the user's skin, to remove scars or acne, to remove "flyaways" in the user's hair, to remove the user's wrinkles or bags under the user's eyes, etc.

In operation 608, the processor calibrates a camera of the client device 102 using the pre-capture setting. In one example, calibrating the camera of the client device 102 using the pre-capture setting includes applying the pre-capture setting the camera used with the messaging client 104.

In operation 610, the processor receives a media content item including an image captured using the camera. In this example, the image is captured with the pre-capture setting applied to the camera and the pre-capture setting is optimized for the user based on the user's setting selection. The media content item can include a photo or video captured by the front camera or the rear camera. For example, the media content item can include a "selfie" (e.g., a photo of the user's face captured by the front camera).

In operation 612, the processor generates a modified media content item by modifying the media content item using the post-processing setting. The post-processing setting that is optimized for the user based on the user's setting selection is used to generate the modified media content item. In one example, the modified media content item includes the image captured using the camera and is being post-processed using the post-processing setting that is optimized for the user based on the user's setting selection.

Examples of Pre-Capture and Post-Processing Based on the Setting Selection

In one example, with the setting selection associated with the user's self-elected skin tone, a range of camera settings can be configured to be optimized for the user's skin tone.

One example of pre-capture settings that can be configured includes the exposure setting of the camera which determines the lightness or darkness of the appearance of the image. The exposure setting is based on an ISO setting, a shutter speed setting and the aperture. By increasing the ISO setting, the camera's sensitivity to light is increased and helps capture images in darker environment. Similarly, another example of pre-capture setting is the HDR capture setting that allows for the camera to enhance the lighting in photos to capture detail in both the bright and dark areas of the image.

In one example, the exposure setting or the ISO setting can be set to increase the camera's sensitivity to light and the HDR capture setting can be activated in response to a selected setting that indicates a darker skin tone for the user.

Gamma correction is one example of the post-processing settings that can be configured by the camera personalization system 216. Gamma correction is configured to adjust the image pixels to adapt for human perception, which is more sensitive to bright color. For example, the gamma correction can be used to render the darker pixels in an image to be more visible to the human eyes while maintaining the balance of the whole picture. In one example, the gamma correction can be used to post-process the images in response to a selected setting that indicates a darker skin tone for the user.

In addition to the selected setting that is based on the skin tone of the user, the pre-capture setting and the post-processing setting that is determined by the processor, in operation 606 in FIG. 6, can also be based on background color and lighting condition of the image that is captured or about to be captured. For example, in low lighting conditions or when the background color is darker, the camera personalization system 216 can increase the ISO setting to increase the camera's sensitivity to light and activate the gamma correction to post-process the image to render the darker pixels more visible.

Diversity in Augmentations

In post-processing, the augmentations (e.g., lens, filters, media overlays, AR/VR) that are applied to modify the media content item can also be informed by the setting selection. For example, each augmentation can include a number of different variations that will apply different modifications to the media content items received from the client devices 102 in the messaging system 100. Each of the different modifications can be optimized for different skin tones.

The camera personalization system 216 can select one of the variations of the augmentations to be applied to a media content item based on the setting selection that is associated with the user's skin tone. In one example, the camera personalization system 216 can account for different beauty standards when selecting the one of the variations of the augmentations to be applied to the media content item based on the user's skin tone. The camera personalization system 216 can thus apply appropriate augmentations that are associated with beautification in post-processing by using the setting selection.

The different modifications can also be optimized for users of different skin tones by including augmentations that apply a modification (e.g., an overlay) realistically on a user's hair or head covering worn by the user. For example, the variation of an overlay that is added to a user's (e.g., changes the user's hair to be a rainbow of colors) should not be applied to the image of a user that is wearing a head covering since the user's hair is not showing in the image. In this example, the camera personalization system 216 can apply the variation of the augmentation that is appropriate based on the setting selection (e.g., changes the user's head dress to be a rainbow of colors).

Similar to asking the user to self-elect a skin tone or skin undertone in the camera personalization interface 500, the camera personalization system 216 can also cause the camera personalization interface 500 to query the user to optionally self-elect a physical impairment (e.g., eyepatch, glasses). The setting selection can further be based on the physical impairment. In this example, based on the setting selection that indicates a physical impairment, the camera personalization system 216 can select the variation of the augmentation that takes into account the physical impairment. For example, when the augmentation is an overlay that changes the color of the user's eyes in the image of the media content item, the camera personalization system 216 can select the variation of the augmentation that only applies to the user's eye that is not covered by the eyepatch. Accordingly, the modified media content item that is generated when this augmentation is added in post-processing will not include a different colored eye on the user's eyepatch.

In one example, the camera personalization system 216 can also identify the camera included in the client device 102. Based on the capabilities of the camera that is identified, the camera personalization system 216 can also determine the pre-capture setting and the post-processing setting that would ensure optimization of the camera experience for the user of the client device 102. For example, the camera personalization system 216 can activate the HDR setting when the camera that is identified can capture images with HDR. The camera personalization system 216 can also set the ISO setting in accordance with the ISO range of the camera that is identified.

Ensuring Quality

To ensure quality of the camera personalization system 216, each skin tone and skin undertone that is supported by the camera personalization system 216 is tested periodically to prevent regression.

Further, the camera personalization system 216 accesses metadata associated with modified media content items that are publicly shared by the users of the client devices 102 in the messaging system 100. The metadata can indicate the pre-capture settings of the camera capturing the media content item, the type of camera used to capture the media content item, and the post-processing settings applied in the media content item, the setting selection (e.g., skin tone, skin undertone, etc.) associated with the camera, the background color, the lighting condition, etc. The camera personalization system 216 can store the metadata in the camera personalization table 318 in the database 126.

The metadata can be processed by a neural network or other machine learning network in the camera personalization system 216 to improve the algorithms implemented by the camera personalization system 216 to determine the pre-capture settings and post-processing settings to be applied based on the setting selection (e.g., skin tone, skin undertone, etc.).

In one example, the neural network can be a Long-Short Term Memory (LSTM) Neural Network, a Convolutional Neural Network (CNN), a recurrent neural network (RNN), a Gated Recurrent Unit (GRU) neural network, or any combination thereof. The neural network can, for instance, receive the metadata as input and generate as an output the pre-capture setting and the post-capture setting in association with the setting selection.

With an optimized algorithm, the camera personalization system 216 can provide a camera experience that works equally well in all lighting conditions for users of all skin tones, religions, and further takes into account physical impairments.

With the camera personalization system 216 being designed to recognize the diversity of the users on the messaging system 100 and making it the obvious norm to account for the range of skin tones, religions, and physical impairments, the experience of the users on the messaging system 100 will be equitable, inclusive and necessarily, enhanced.

Machine Architecture

Figure 7:
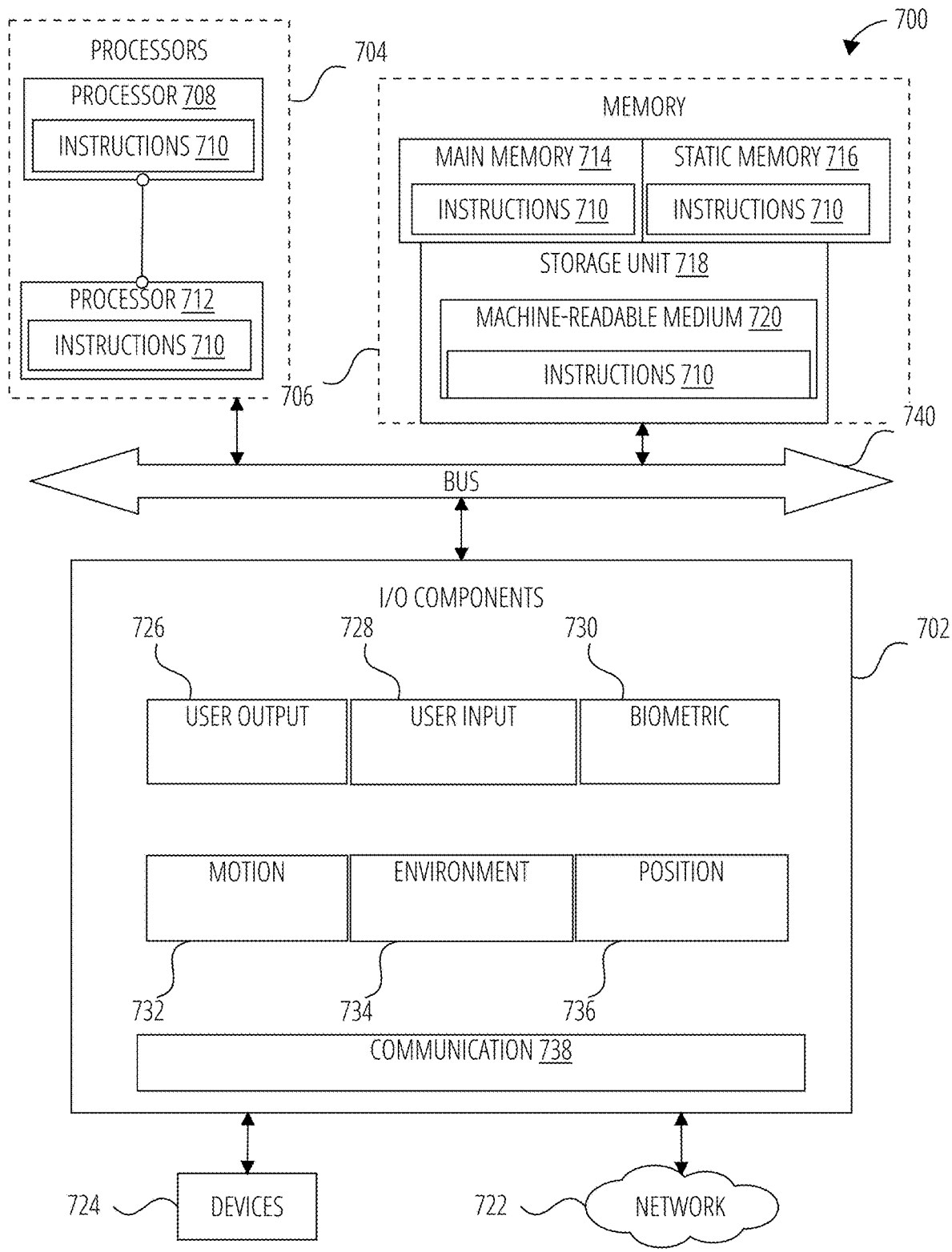
FIG. 7 is a diagrammatic representation of a machine in the form of a computer system within which a set of instructions may be executed for causing the machine to perform any one or more of the methodologies discussed herein, in accordance with some examples.

FIG. 7 is a diagrammatic representation of the machine 700 within which instructions 710 (e.g., software, a program, an application, an applet, an app, or other executable code) for causing the machine 700 to perform any one or more of the methodologies discussed herein may be executed. For example, the instructions 710 may cause the machine 700 to execute any one or more of the methods described herein. The instructions 710 transform the general, non-programmed machine 700 into a particular machine 700 programmed to carry out the described and illustrated functions in the manner described. The machine 700 may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 710, sequentially or otherwise, that specify actions to be taken by the machine 700. Further, while only a single machine 700 is illustrated, the term "machine" shall also be taken to include a collection of machines that individually or jointly execute the instructions 710 to perform any one or more of the methodologies discussed herein. The machine 700, for example, may comprise the client device 102 or any one of a number of server devices forming part of the messaging server system 108. In some examples, the machine 700 may also comprise both client and server systems, with certain operations of a particular method or algorithm being performed on the server-side and with certain operations of the particular method or algorithm being performed on the client-side.

The machine 700 may include processors 704, memory 706, and input/output I/O components 702, which may be configured to communicate with each other via a bus 740. In an example, the processors 704 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 708 and a processor 712 that execute the instructions 710. The term "processor" is intended to include multi-core processors that may comprise two or more independent processors (sometimes referred to as "cores") that may execute instructions contemporaneously. Although FIG. 7 shows multiple processors 704, the machine 700 may include a single processor with a single-core, a single processor with multiple cores (e.g., a multi-core processor), multiple processors with a single core, multiple processors with multiples cores, or any combination thereof.

The memory 706 includes a main memory 714, a static memory 716, and a storage unit 718, both accessible to the processors 704 via the bus 740. The main memory 706, the static memory 716, and storage unit 718 store the instructions 710 embodying any one or more of the methodologies or functions described herein. The instructions 710 may also reside, completely or partially, within the main memory 714, within the static memory 716, within machine-readable medium 720 within the storage unit 718, within at least one of the processors 704 (e.g., within the Processor's cache memory), or any suitable combination thereof, during execution thereof by the machine 700.

The I/O components 702 may include a wide variety of components to receive input, provide output, produce output, transmit information, exchange information, capture measurements, and so on. The specific I/O components 702 that are included in a particular machine will depend on the type of machine. For example, portable machines such as mobile phones may include a touch input device or other such input mechanisms, while a headless server machine will likely not include such a touch input device. It will be appreciated that the I/O components 702 may include many other components that are not shown in FIG. 7. In various examples, the I/O components 702 may include user output components 726 and user input components 728. The user output components 726 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 728 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 702 may include biometric components 730, motion components 732, environmental components 734, or position components 736, among a wide array of other components. For example, the biometric components 730 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 732 include acceleration sensor components (e.g., accelerometer), gravitation sensor components, rotation sensor components (e.g., gyroscope).

The environmental components 734 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 736 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 702 further include communication components 738 operable to couple the machine 700 to a network 722 or devices 724 via respective coupling or connections. For example, the communication components 738 may include a network interface Component or another suitable device to interface with the network 722. In further examples, the communication components 738 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 724 may be another machine or any of a wide variety of peripheral devices (e.g., a peripheral device coupled via a USB).

Moreover, the communication components 738 may detect identifiers or include components operable to detect identifiers. For example, the communication components 738 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 738, such as location via Internet Protocol (IP) geolocation, location via Wi-Fi® signal triangulation, location via detecting an NFC beacon signal that may indicate a particular location, and so forth.

The various memories (e.g., main memory 714, static memory 716, and memory of the processors 704) and storage unit 718 may store one or more sets of instructions and data structures (e.g., software) embodying or used by any one or more of the methodologies or functions described herein. These instructions (e.g., the instructions 710), when executed by processors 704, cause various operations to implement the disclosed examples.

The instructions 710 may be transmitted or received over the network 722, using a transmission medium, via a network interface device (e.g., a network interface component included in the communication components 738) and using any one of several well-known transfer protocols (e.g., hypertext transfer protocol (HTTP)). Similarly, the instructions 710 may be transmitted or received using a transmission medium via a coupling (e.g., a peer-to-peer coupling) to the devices 724.

Software Architecture

Figure 8:
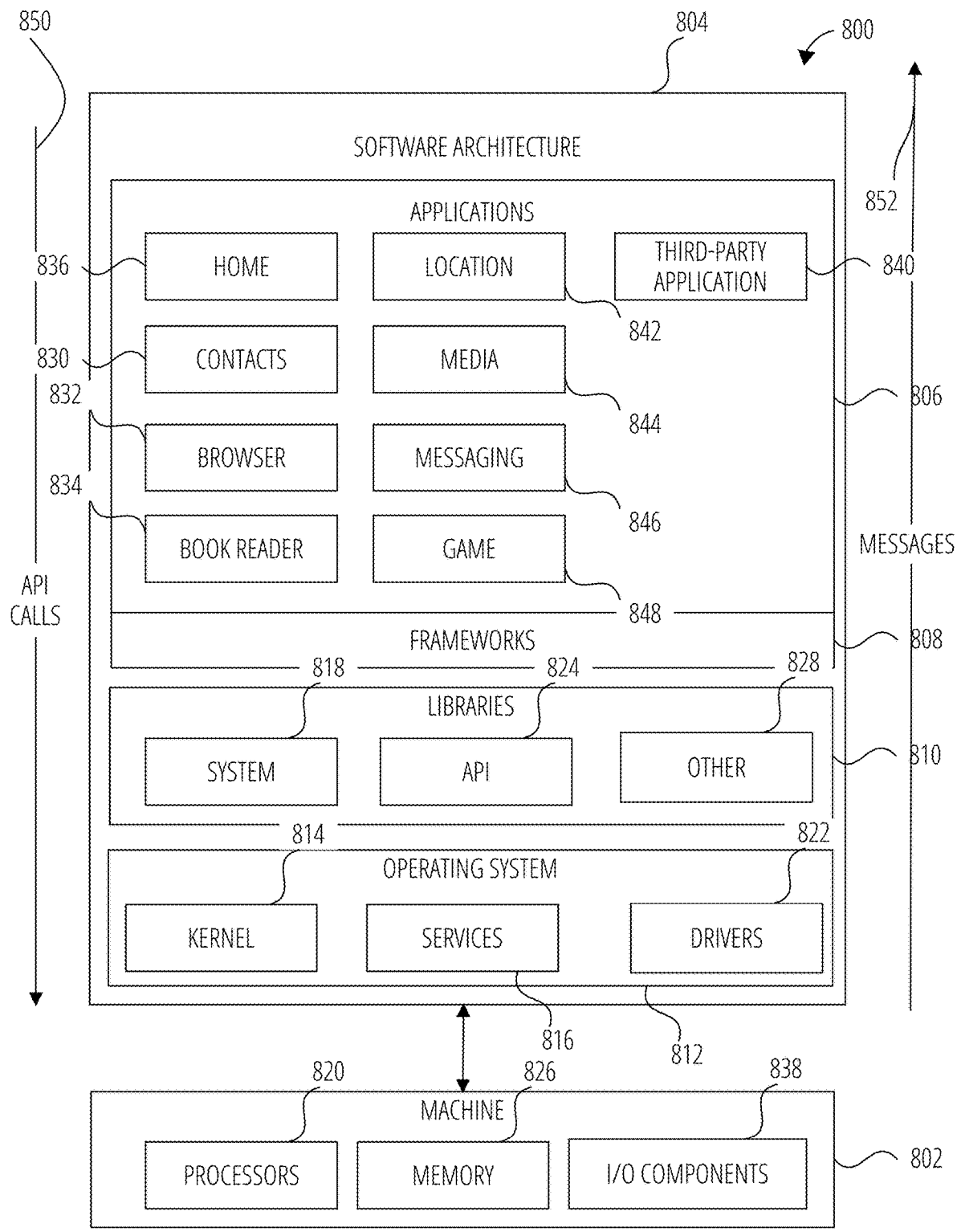
FIG. 8 is a block diagram showing a software architecture within which examples may be implemented.

FIG. 8 is a block diagram 800 illustrating a software architecture 804, which can be installed on any one or more of the devices described herein. The software architecture 804 is supported by hardware such as a machine 802 that includes processors 820, memory 826, and I/O components 838. In this example, the software architecture 804 can be conceptualized as a stack of layers, where each layer provides a particular functionality. The software architecture 804 includes layers such as an operating system 812, libraries 810, frameworks 808, and applications 806. Operationally, the applications 806 invoke API calls 850 through the software stack and receive messages 852 in response to the API calls 850.

The operating system 812 manages hardware resources and provides common services. The operating system 812 includes, for example, a kernel 814, services 816, and drivers 822. The kernel 814 acts as an abstraction layer between the hardware and the other software layers. For example, the kernel 814 provides memory management, processor management (e.g., scheduling), component management, networking, and security settings, among other functionalities. The services 816 can provide other common services for the other software layers. The drivers 822 are responsible for controlling or interfacing with the underlying hardware. For instance, the drivers 822 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 810 provide a common low-level infrastructure used by the applications 806. The libraries 810 can include system libraries 818 (e.g., C standard library) that provide functions such as memory allocation functions, string manipulation functions, mathematic functions, and the like. In addition, the libraries 810 can include API libraries 824 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 810 can also include a wide variety of other libraries 828 to provide many other APIs to the applications 806.

The frameworks 808 provide a common high-level infrastructure that is used by the applications 806. For example, the frameworks 808 provide various graphical user interface (GUI) functions, high-level resource management, and high-level location services. The frameworks 808 can provide a broad spectrum of other APIs that can be used by the applications 806, some of which may be specific to a particular operating system or platform.

In an example, the applications 806 may include a home application 836, a contacts application 830, a browser application 832, a book reader application 834, a location application 842, a media application 844, a messaging application 846, a game application 848, and a broad assortment of other applications such as a third-party application 840. The applications 806 are programs that execute functions defined in the programs. Various programming languages can be employed to create one or more of the applications 806, structured in a variety of manners, such as object-oriented programming languages (e.g., Objective-C, Java, or C++) or procedural programming languages (e.g., C or assembly language). In a specific example, the third-party application 840 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 840 can invoke the API calls 850 provided by the operating system 812 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A system comprising:
   a processor; and
   a memory having instructions stored thereon, when executed by the processor, causes the system to perform operations comprising:
   causing a camera personalization interface to be displayed by a display of a client device;
   receiving a setting selection from a user of the client device via the camera personalization interface, wherein the setting selection from the user indicates a skin tone that the user selected from a plurality of skin tones as being indicative of the user's skin tone;
   determining a pre-capture setting based on the setting selection from the user and a post-processing setting based on the setting selection from the user;
   calibrating a camera of the client device using the pre-capture setting;
   receiving a media content item including an image captured using the camera; and
   generating a modified media content item by modifying the media content item using the post-processing setting.

2. The system of claim 1, wherein the camera of the client device is a front camera or a rear camera.

3. The system of claim 1, wherein the pre-capture setting comprises at least one of:
an International Organization for Setting (ISO) setting, an exposure setting, a black and white balance setting, a focus area setting, or a High Dynamic Range (HDR) capture setting.

4. The system of claim 1, the post-processing setting comprises at least one of: a Gamma correction, a color tone mapping, de-noising, or beautification.

5. The system of claim 1, wherein determining the pre-capture setting and the post-processing setting is further based on a background color or a lighting condition.

6. The system of claim 1, wherein the camera personalization interface comprises a plurality of selectable items associated with the plurality of skin tones, wherein the setting selection is associated with one of the plurality of selectable items.

7. The system of claim 1, wherein the camera personalization interface comprises a preview displaying an image captured by the camera of the client device, wherein the camera is a front camera.

8. The system of claim 7, wherein the camera personalization interface comprises a selectable slider configured to adjust the image displayed in the preview, wherein the setting selection is based on the selectable slider.

9. The system of claim 1, wherein the setting selection further indicates a skin undertone of the user of the client device.

10. The system of claim 1, wherein the setting selection is associated with an avatar associated with a user of the client device.

11. A method comprising:
    causing, by a processor, a camera personalization interface to be displayed by a display of a client device;
    receiving a setting selection from a user of the client device via the camera personalization interface, wherein the setting selection from the user indicates a skin tone that the user selected from a plurality of skin tones as being indicative of the user's skin tone;
    determining a pre-capture setting based on the setting selection from the user and a post-processing setting based on the setting selection from the user;
    calibrating a camera of the client device using the pre-capture setting;
    receiving a media content item including an image captured using the camera; and
    generating a modified media content item by modifying the media content item using the post-processing setting.

12. The method of claim 11, wherein the camera of the client device is a front camera or a rear camera.

13. The method of claim 11, wherein the pre-capture setting comprises at least one of: an International Organization for Setting (ISO) setting, an exposure setting, a black and white balance setting, a focus area setting, or a High Dynamic Range (HDR) capture setting.

14. The method of claim 11, wherein the post-processing setting comprises at least one of: a Gamma correction, a color tone mapping, de-noising, or beautification.

15. The method of claim 11, wherein determining the pre-capture setting and the post-processing setting is further based on a background color or a lighting condition.

16. The method of claim 11, wherein the camera personalization interface comprises a plurality of selectable items associated with the plurality of skin tones, wherein the setting selection is associated with one of the plurality of selectable items.

17. The method of claim 11, wherein the camera personalization interface comprises a preview displaying an image captured by the camera of the client device, wherein the camera is a front camera.

18. The method of claim 17, wherein the camera personalization interface comprises a selectable slider configured to adjust the image displayed in the preview, wherein the setting selection is based on the selectable slider.

19. The method of claim 11, wherein the setting selection further indicates a skin undertone of the user of the client device.

20. The method of claim 11, wherein the setting selection is associated with an avatar associated with a user of the client device.

21. A non-transitory computer-readable storage medium having stored thereon instructions, when executed by a processor, causes the processor to perform operations comprising:

causing a camera personalization interface to be displayed by a display of a client device;

receiving a setting selection from a user of the client device via the camera personalization interface, wherein the setting selection from the user indicates a skin tone that the user selected from a plurality of skin tones as being indicative of the user's skin tone;

determining a pre-capture setting based on the setting selection from the user and a post-processing setting based on the setting selection from the user;

calibrating a camera of the client device using the pre-capture setting;

receiving a media content item including an image captured using the camera; and generating a modified media content item by modifying the media content item using the post-processing setting.

* * * * *